(12) United States Patent
Eid et al.

(10) Patent No.: US 11,174,165 B2
(45) Date of Patent: Nov. 16, 2021

(54) SCALABLE NITROGEN ENRICHED CARBON-BASED NANOSYSTEMS FOR EFFICIENT AND PROMPT CAPACITIVE SEAWATER DESALINATION UNDER AMBIENT CONDITIONS

(71) Applicant: QATAR UNIVERSITY, Doha (QA)

(72) Inventors: Kamel Abdelmoniem Mohamed Eid, Sharkia (EG); Mostafa Hussien Ramadan Sliem, Sharkia (EG); Aboubakr Moustafa Abdullah, Giza (EG)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 16/839,006

(22) Filed: Apr. 2, 2020

(65) Prior Publication Data
US 2021/0221684 A1    Jul. 22, 2021

Related U.S. Application Data

(63) Continuation of application No. 16/745,533, filed on Jan. 17, 2020, now abandoned.

(51) Int. Cl.
| | | |
|---|---|---|
| *C01B 21/06* | (2006.01) | |
| *C02F 1/461* | (2006.01) | |
| *C02F 101/30* | (2006.01) | |
| *C02F 103/08* | (2006.01) | |
| *C02F 101/20* | (2006.01) | |

(52) U.S. Cl.
CPC ...... *C01B 21/0605* (2013.01); *C02F 1/46109* (2013.01); *C01P 2002/52* (2013.01); *C01P 2004/17* (2013.01); *C01P 2006/12* (2013.01); *C01P 2006/16* (2013.01); *C02F 2001/46138* (2013.01); *C02F 2101/20* (2013.01); *C02F 2101/308* (2013.01); *C02F 2103/08* (2013.01); *C02F 2303/04* (2013.01)

(58) Field of Classification Search
None
See application file for complete search history.

(56) References Cited

U.S. PATENT DOCUMENTS

2006/0093915 A1   5/2006 Lundquist et al.

FOREIGN PATENT DOCUMENTS

| CN | 103021662 A | 4/2013 |
| CN | 103745836 A | 4/2014 |
| CN | 105057000 A * | 11/2015 |

(Continued)

OTHER PUBLICATIONS

Duan et al.; Porous C3N4 Nanolayers@ N-Graphene Films as Catalyst Electrodes for Highly Efficient Hydrogen Evolution; ACS Nano; vol. 9, No. 1 931-940; 2015.*

(Continued)

*Primary Examiner* — Guinever S Gregorio
(74) *Attorney, Agent, or Firm* — Squire Patton Boggs (US) LLP (57) ABSTRACT

Herein, provided are new classes of nitrogen enriched graphitic-like carbon-based materials porous nanosheets doped atomically with one or more metal atoms and/or non-metal traces, for example, binary Pt and Cu denoted as (Pt—Cu-gCN-Ns), and methods of making and using the materials, for example, in capacitive seawater desalination under ambient reaction conditions and parameters.

19 Claims, 9 Drawing Sheets

(56) References Cited

FOREIGN PATENT DOCUMENTS

| | | |
|---|---|---|
| CN | 106449156 A | 2/2017 |
| CN | 107555553 A | 1/2018 |
| CN | 109103028 A | 12/2018 |

OTHER PUBLICATIONS

Jimoh Oladummi et al., "A Comprehensive Review on Recently Developed Carbon Based Nanocomposites for Capacitive Deionization: From Theory to Practice", Separation and Purification Technology 207 (2018), pp. 291-320, journal homepage: www.elsevier.com/locate/seppur, Department of Chemical Engineering, Khalifa University of Science and Technology, P.O. Box 2533, Abu Dhabi, United Arab Emirates.

S. Porada et al., "Review on the Science and Technology of Water Desalination by Capacitive Deionization", Progress in Materials Science 58 (2013), pp. 1388-1442, journal homepage: www.elsevier.com/locate/pmatsci, http://dx.doi.org/10.1016/j.pmatsci.2013.03.005.

Dmitriy Sergeyevich Likhachev et al., Desalination and Water Treatment 51 Mar. 2013, pp. 2836-2849, http://www.tandfonline.com/loi/tdwt20, "Large-Scale Water Desalination Methods: A review and New Perspectives", www.deswater.com, link to article: http://dx.doi.org/10.1080/19443994.2012.750792.

J.E. Dykstra et al., "Energy Consumption in Capactivie Deionization—Constant Current Versus Constant Voltage Operation", Water Research 143 (2018), pp. 367-375, journal homepage: www.elsevier.com/locate/watres, https://doi.org/10.1016/j.watres.2018.06.034.

K. Singh et al., Timeline on the Application of Intercalation Materials in Capactive Deionization, Desalination 455 (2019), pp. 115-134, journal homepage: www.elsevier.com/locate/desal, https://doi.org/10.1016/j.desal.2018.12.015.

Md Ashique Ahmed et al., "Capacitive Deionization: Processes, Materials and State of the Technology", Journal of Electroanalytical Chemistry 813 (2018), pp. 178-192, College of Engineering & Science, Louisiana Tech University, Ruston, LA 71270, USA, journal homepage: www.elsevier.com/locate/jelechem, https://doi.org/10.1016/j.jelechem.2018.02.024.

A. Thamilselvan et al., "Review on Carbon-Based Electrode Materials for Application in Capactivie Deionization Process", Int. J. Environ. Sci. Technol. (2016) 13:2961-2976, Islamic Azad University (IAU) 2016, DOI 10.1007/s113762-016-1061-9.

Tie Gao et al., "Metal-Organic-Framework Derived Carbon Polyhedron and Carbon Nanotube Hybrids as Electrode for Electrochemical Supercapacitor and Capacitive Deionization", Electrochimica Acta 263 (2018), pp. 85-93, journal homepage: www.elsevier.com/locate/electacta, https://doi.org/10/1016/j.electacta.2018.01.044.

Bing Han et al., "Structure and Functionality Design of Novel Carbon and Faradaic Electrode Materials for High-Performance Capacitive Deionization", Chemical Engineering Journal 360 (2019), pp. 364-384, journal homepage: www.elsevier.com/locate/cej, https://doi.org/10.1016/j.cej.2018.11.236.

Xingtao Xu et al, "Capacitive Deionizaiton Using Nitrogen-doped Mesostructured Carbons for Highly Efficient Brackish Water Desalination", Chemical Engineering Journal 362 (2019), pp. 887-896, journal homepage: www.elsevier.com/locate/cej, https://doi.org/10.1016/j.cej.2019/01.098.

Miao Wang et al., "High Performance Capacitive Deionization Electrodes Based on Ultrathin Nitrogen-Doped Carbon/Graphene nano-Sandwiches", ChemComm, Royal Society of Chemistry (2017), DOI: 10.1039/c7cc05673g, rsc.li/chemcomm.

Junjiang Zhu et al., "Graphitic Carbon Nitride: Synthesis, Properties, and Applications in Catalysis", ACS Applied Materials & Interfaces, www.acsami.org, 2014, 6, American Chemical Society, pp. 16449-16465, dx.doi.org/10.1021/am502925j.

Xinchen Wang et al., "Polymeric Graphitic Carbon Nitride for Heterogeneous Photocatalysis", ACS Catalysis 2012, 2, pubs.acs.org/acscatalysis, 2012 American Chemical Society, pp. 1596-1606, dx.doi.org/10.1021/cs300240x.

Michio Inagaki et al., "Graphitic Carbon Nitrides ($g$-$C_3N_4$) with Comparative Discussion to Carbon Materials", Carbon 141 (2019), pp. 580-607, journal homepage: www.elsevier.com/locate/carbon, https://doi.org/10/1016/j.carbon.2018.09/082.

Fabian K. Kessler et al., "Functional Carbon Nitride Materials—Design Strategies for Electrochemical Devices", Nature Reviews Materials, vol. 2, article No. 17031, 17 pages, doi: 01.1038/natrevmats.2017.30.

Wenhan Niu et al., "Graphitic Carbon Nitride for Electrochemical Energy Conversion and Storage", ACS Energy Letters 2018, 3, pp. 2796-2815, http://pubs.acs.org/journal/aelccp, ACS Publications 2018 American Chemical Society, DOI: 10.1021/acsenergylett.8b01594.

Chi Zhang et al., Graphitic Carbon Nitride ($g$-$C_3N_4$)-based Photocatalysts for Water Disinfection and Microbial Control: A Review, Chemosphere 214 (2019), pp. 462-479, journal homepage www.elsevier.com/locate/chemosphere, https://doi.org/10.1016/j.chemosphere.2018.09.137.

M.E. Suss et al., "Water Desalination via Capacitive Deionizaiton: What is it and What Can We Expect From It?", Energy and Environmental Science, Royal Society of Chemistry 2015, www.rsc.org/ees, Energy Environ. Sci., 2015, 8, 2296-2319, DOI: 10.1039/c53300519a.

Jongmoon Choi et al., "Applications of Capactivie Deionization: Desalination, Softening, Selective Removal, and Energy Efficiency", Desalination 449 (2019), pp. 118-130, https://doi.org/10.1016/j.desal.2018.10.013.

* cited by examiner

SCALABLE NITROGEN ENRICHED CARBON-BASED NANOSYSTEMS FOR EFFICIENT AND PROMPT CAPACITIVE SEAWATER DESALINATION UNDER AMBIENT CONDITIONS

CROSS-REFERENCE TO RELATED APPLICATIONS

This application is a continuation of U.S. patent application Ser. No. 16/745,533, entitled NOVEL SCALABLE NITROGEN ENRICHED CARBON-BASED NANOSYSTEMS FOR EFFICIENT AND PROMPT CAPACITIVE SEAWATER DESALINATION UNDER AMBIENT CONDITIONS, filed Jan. 17, 2020, the disclosure of which is incorporated herein by reference in its entirety for all purposes.

TECHNICAL FIELD

The presented patent application is related to new classes of nitrogen enriched graphitic-like carbon-based materials doped with for example Pt and Cu at the atomic level (Pt—Cu-gCN-Ns) and use thereof as electrodes for capacitive seawater desalination under ambient conditions under low potential at room temperature in presence or absence of light.

BACKGROUND

The ceaseless consumption of water resources and the rare availability of freshwater are the most crucial problem that jeopardizes humanity nowadays, because only 0.014% of fresh water is available on the earth, whereas 97% is saline, and 3% is inaccessible. [1-3] The reverse osmosis, nanofiltration, thermal separation, distillation, and electro-deionization are the ubiquitous desalination technologies, however their complex operation, high-energy consumption, high-cost, membrane fouling, and inevitable pollutions limit their utilization in our future societies. [3-5]

Unlike these approaches, capacitive deionization (CDI) method is a highly efficient, durable, environmental compatible, and cost-effective desalination method that relies on the electric double layer of materials. [3, 4, 6-9] Various carbonaceous materials including activated carbon, carbon aerogel, composites, graphene-based materials, carbon nanofibers, and carbon nanotubes are successfully developed for CDI, attributed to their high specific surface area, proper electrical conductivity, and stability. [6-11] However, the high manufacturing cost, the absence of scalable synesthetic approach, and the lower adsorption capacity preclude further application as CDI electrode materials. [3, 4, 11-13] Most importantly these electrode materials are commonly used for brackish water with low saline concertation (500 ppm and 4000 ppm) and never been used for a real seawater. [3, 4, 11] Thus, developing new electrode materials with a high surface area, great salt adsorption capacity, lower electrical resistivity, efficient ion storage, significant water recovery, and low cost is urgent for efficient desalination capacity.

Unlike other carbonaceous materials, nitrogen-enriched carbon-based materials (CNM) nanostructure especially graphitic-like carbon nitrides (gCN) are imminent with their unique thermal stability (up to 600° C. in air), chemical inertness (insoluble in water, acidic, neutral and basic solvents), and rich surface merits (basic surface functionalities, electron-rich, active sites, H-bonding motifs, and abundant defects), which can promote the CDI efficiency. [14-16] In addition, the earth abundant with low-cost resources, scalable preparation methods, and simply tailored structure of gCN are important features in the commercial applications. [15-18]

Moreover, the impressive antibacterial, antifungal, and antiviral properties of gCN would potentiate its wide applications for water disinfection and microbial control. [19] Enlightened by these merits, a wide range of strategies were developed for the controlled synthesis of gCN with different structures such as thermal condensation, supramolecular pre-assembly, microwave-assisted, molten salt, ionic liquid. [15, 16, 18]

Albeit the notable achievements in the fabrication of gCNs for various applications, their utilization as electrodes in CDI is not yet reported, owing to their low conductivity and lower accessible surface area. The present inventor found that these obstacles could be overcome via doping gCNs with various metal atoms (Pd, Cu, Zn, and Cu) and nonmetal traces (S, F, and P). This endows the gCNs with not only a great electrical conductivity, prompt diffusion rate, and quick electron transfer, but also providing an additional pseudocapacitive contribution for ion adsorption results in a substantial enhancement in the salt adsorption capacity (SAC). Meanwhile, these dopants along with the abundant N-atoms inside gCN may serve as active sites for ion adsorption and/or transportation, results in a significant enhancement in the SAC. Inspired by the unique structural and compositional merits of gCNs, the present inventors have investigated their utilization in CDI.

SUMMARY

Herein, provided are new classes of nitrogen enriched graphitic-like carbon-based materials porous nanosheets doped atomically with binary metal elements, for example, Pt and Cu denoted as Pt—Cu-gCN-Ns and their utilization in capacitive seawater desalination under ambient reaction conditions and parameters, and methods for synthesizing the materials. The methods include polymerization of nitrogen rich compound melamine in an aqueous solution of ethanol contains Pt and Cu precursors followed by carbonization under nitrogen. The as-synthesized Pt—Cu-gCN-Ns are formed in a high yield of multi-layered porous nanosheets with multiple pores. The co-doping effect improved the physicochemical merits of Pt—Cu-gCN-Ns substantially, including surface area, conductivity, porosity, and electronic structure. The as-synthesized Pt—Cu-gCN-Ns were used successfully as active electrodes for the capacitive deionization (CDI), which exhibited a high salt adsorption capacity (SAC) (32.7%) within 5 minutes at room temperature and 1 V. Interestingly, within only 30 seconds under the UV-light irradiation the developed materials SAC of (29.23%) under 1 V.

Provided herein is a carbon nitride material that is a nitrogen enriched carbon material.

Provide herein is a method for preparing the carbon nitride material disclosed herein.

Provided herein is an electrode comprising a carbon nitride material disclosed herein.

Provided herein are methods for preparing an electrode comprising a carbon nitride material disclosed herein, and electrodes prepared by the methods.

Provided here in is a capacitive deionization (CDI) process using the electrode disclosed herein.

Provided herein is a capacitive deionization (CDI) system comprising an electrode disclosed herein.

BRIEF DESCRIPTION OF THE DRAWINGS

FIG. 1 shows the designed CDI system consisting of or comprising a power supply unit, cell, and working electrodes as well as a light source.

FIG. 2 shows SEM images of Pt—Cu-gCN-Ns (FIG. 2a and FIG. 2b) and gCN-Ns (FIG. 2c and FIG. 2d). FIG. 2a shows the SEM image of typically prepared Pt—Cu-gCN-Ns under typical conditions formed in a high yield of multi-layered nanosheets. FIG. 2b shows that these nanosheets are porous with an average pore diameter of 40±3 nm along with some small pores in the range of 10 nm. FIG. 2c displayed the SEM image of metal-free gCN formed in a nanosheets structure.

FIG. 3 shows (FIG. 3a) TEM image, (FIG. 3b) HAADF-STEM, (FIGS. 3c-f) element mapping of Pt—Cu-gCN-Ns. FIG. 3a shows the TEM image of Pt—Cu-gCN-Ns, obtained in well-defined multiple layered nanostructures with various pores. FIG. 3b shows the high-angle annular dark-field scanning transmission electron microscopy (HAADF-STEM) image, which clearly warrants the formation of porous nanosheets as confirmed by the difference in the contrast between porous and solid area. FIG. 3c, FIG. 3d, FIG. 3e, and FIG. 3f show the element mapping analysis used to investigate the composition of the as-synthesized Pt—Cu-gCN-Ns, which reveal the coherent distribution of Pt, Cu, C, and N in the as-obtained materials.

FIG. 5 displays the nitrogen isotherm measurements of Pt—Cu-gCN-Ns compared to gCN-Ns, which both reveal the isotherm features close to a type I hysteresis loop curve. FIG. 5a shows the Brunauer-Emmett-Teller surface area of Pt—Cu-gCN-Ns (180.3 m$^2$ g$^{-1}$). FIG. 5b shows that the average pore size distribution of Pt—Cu-gCN-Ns (42 nm). FIG. 5c shows that of gCNs (150.2 m$^2$ g$^{-1}$). FIG. 5d shows that of gCN-Ns (32 nm). FIG. 5b and FIG. 5d show that the average pore size distribution of Pt—Cu-gCN-Ns (42 nm) (FIG. 5b) is larger than that of gCN-Ns (32 nm) (FIG. 5d).

FIG. 7 shows the CDI salt adsorption capacity of Pt—Cu-gCN-Ns as a function of time estimated by the ion chromatography over seawater (35,000 ppm) without any kind of commercial additives such as activated graphene, carbon cloth, polymeric binders, and/or graphic sheets.

FIG. 9 demonstrates the CDI mechanism on Pt—Cu-gCN-Ns based on the on the electrical double layer. This is including the removal the ions of NaCl during the charging process (Na$^+$ ions are adsorbed on the cathode, while Cl$^-$ are adsorbed on the anode).

DESCRIPTION

The present inventors prepared new classes of graphitic-like carbon nitrides (gCN) as electrodes for efficient and quick capacitive water deionization (CDI), also known as capacitive water desalination, under ambient conditions have not been reported before. The materials of present invention possess various advantageous over traditional carbon-based materials including unique thermal stability (up to 600° C. in air), chemical inertness (insoluble in water, acidic, neutral and basic solvents), and rich surface merits (basic surface functionalities, electron-rich, active sites, H-bonding motifs, and abundant defects), which enhances the CDI efficiency. Also, the earth abundant with low-cost resources, scalable preparation methods, and simply tailored structure of gCN are important features in its commercial applications. Moreover, the impressive antibacterial, antifungal, and antiviral properties of gCN, potentiates its wide applications of water disinfection and microbial control. The physiochemical properties of gCN electrodes are tailored through their doping with binary metal atoms to improve the electrical conductivity, the diffusion rate and electron transfer along with providing an additional pseudocapacitive contribution for ion adsorption which results in a substantial enhancement in the CDI efficiency. Meanwhile, these dopants along with the abundant N-atoms inside gCN may serve as active sites for ion adsorption and/or transportation, results in a significant enhancement in the SAC.

The materials of the present invention were used to desalinate seawater using CDI method. The desalination process was carried out at room temperature and under 1 V for seawater (which is more saline than brackish water that is always reported) without using any commercial additives or conducting materials. The results were compared with previous reports within only 30 second under the UV-light irradiation, the developed materials have salt adsorption capacity (SAC) of 29.23% at 1 V.

The presented invention can be directly used in desalination of seawater, brackish water or other wastewater as well as water treatment process such as heavy metal removal and pollutants removals as well as water purification. Furthermore, the present invention may be used in energy conversion, production, and storage.

The present invention is different from existing technologies or materials, at least, in the following ways: (1) carbon nitride-based materials have never been used in the CDI, owing to their poor conductivity and lower surface area. Here the present invention improved the physiochemical merits of these materials including but not limited surface area, porosity, conductivity, accessible active sites, and capacitance, using atomic-doping with binary metals at the atomic scale level. (2) The materials of the present invention can be easily synthesized from inexpensive and earth abundant materials as well as easily to be handled or modified. (3) The materials of the present invention can be used as electrodes for capacitive desalination of seawater without using any commercial additives, at a low potential of 1 V, and at room temperature. (4) The materials of the present invention can be used for capacitive seawater desalination not brackish water or low saline water as elsewhere reported. (5) Compared with previous CDI materials that is not only cumbersome, but energy consumers, the materials of the present invention can desalinate seawater within few seconds under only 1 V.

The adsorption capacity of the developed materials reaching 100% under the same reaction conditions can be realized easily using various commercial additives to improve the conductivity of our materials. In addition, the physiochemical properties of the materials of the present invention can be further improved by using multimodal dopants such as metals with non-metal traces. The atomic co-doping of gCN-Ns with both Pt and Cu led to enhancement the surface area and pore sizes to be (180.3 m$^2$ g$^{-1}$ and 42 nm) compared to undoped gCN-Ns (150.2 m$^2$ g$^{-1}$ and 32 nm), respectively. Other physicochemical properties could be also improved and other metal dopants or nonmetal dopants will be proved later as will be proved in the mentioned claims.

As disclosed herein, graphitic-like carbon nitrides (gCN) refer to a family of chemical compounds such as graphitic carbon nitride-based, nitrogen enriched graphitic carbon, and nitrogen doped graphitic carbon with and without metal or non-metal dopants.

Distinct from traditional $gC_3N_4$ materials that possess inferior surface are and electrical conductivity, the graphitic-like carbon nitrides (gCN) materials of the present invention have physiochemical properties such as high electrical conductivity, high diffusion rate, and quick electron transfer along with additional pseudocapacitive contribution for ion adsorption.

Provided herein is a simple method for scalable one-pot fabrication of graphitic-like carbon nitrides (gCN) atomically doped with binary metal toms without a template, multiple steps, and severe high-temperature. The metal dopants altered the physicochemical properties of the obtained gCN results in outstanding electrical conductivity, surface area, and adsorption capacity. The obtained gCN materials combine the unique properties of binary metal dopants, crystalline graphitic, and amorphous carbon nitride. The mitogen content in the materials of the present invention is over 50% of the total atomic contents. Finally, the gCN materials of the present invention were used as electrodes for seawater (350000 ppm NaCl) desalination under only 1 V without using any commercial additives or adsorbents. Therefore, the materials of the present invention is fully different and distinct from materials previously reported.

In some embodiments, various dopant-free and doped gCN materials are prepared. The morphology and composition of the as-prepared gCN include but not limited to nanosheets, nanofibers, and nanowires, and nanospheres with various physiochemical properties. In some embodiments, various dopant-free and doped gCN materials can be prepared based on the polymerization and annealing of nitrogen-enriched precursors.

In an example, various dopant-free and doped gCN materials were prepared based on the polymerization and annealing of nitrogen-enriched precursors. The reaction conditions and parameters tailor the morphology and composition of the as-prepared gCN including but not limited to nanosheets, nanofibers, and nanowires, and nanospheres with various physiochemical properties. In one example, porous two-dimensional Pt and Cu doped gCN nanosheets denoted as (Pt—Cu-gCN-Ns) were prepared by addition of melamine (1 gram) into an aqueous solution of 60 mL ethanol containing potassium tetrachloroplatinate (II) (1 mL of 20 mM) and copper (II) sulfate pentahydrate (1 mL of 20 mM) under stirring at 30° C., then nitric acid (30 mL of 1 M) was quickly added and left for 2 hours to be aged. The obtained yellowish slurry was filtered and washed with ethanol and water for 4 times to remove any unreacted materials followed by subsequent drying at 100° C. for 2 hours before being annealed at 600° C. for 2 hours under nitrogen in a tube furnace, wherein the heating and cooling rate was 3.08° C./min.

In an example, two-dimensional dopant-free gCN nanosheets were synthesized by the same method with fixing all other reaction conditions and parameters, but without using potassium tetrachloroplatinate (II) and copper (II) sulfate, as a reference.

Characterization

In some embodiments, the as-prepared materials are characterized using various methods and/or instruments, including imaging using a scanning electron microscope (SEM) and a transmission electron microscope (TEM), equipped with an energy dispersive spectrometer (EDS), and high-angle annular dark-field scanning transmission electron microscopy (HAADF-STEM); X-ray photoelectron spectroscopy (XPS) spectra measured on a Kratos Axis equipped with a monochromatic Al Kα radiation source under a UHV environment; X-ray diffraction patterns (XRD) measured on an X-ray diffractometer using Cu Kα X-ray source; Fourier transform infrared spectra were recorded on a Thermo Nicolet Nexus 670 FTIR spectrometer; nitrogen physisorption isotherms measured on a Quanta chrome Instrument Corporation Autosorb-1 analyser.

In some examples, the as-prepared materials were imaged using a scanning electron microscope (SEM, for example, Hitachi S-4800, Hitachi, Tokyo, Japan) and a transmission electron microscope (TEM, for example, TecnaiG220, FEI, Hillsboro, Oreg., USA), equipped with an energy dispersive spectrometer (EDS), and high-angle annular dark-field scanning transmission electron microscopy (HAADF-STEM. The X-ray photoelectron spectroscopy (XPS) spectra were measured on a Kratos Axis (for example, Ultra DLD XPS Kratos, Manchester, UK) equipped with a monochromatic Al Kα radiation source (for example, 1486.6 eV) under a UHV environment (for example, ca. 5×10$^{-9}$ Torr). The X-ray diffraction patterns (XRD) were measured on an X-ray diffractometer (for example, X'Pert-Pro MPD, PANalytical Co., Almelo, Netherlands) using Cu Kα X-ray source (for example, λ=1.540598 Å). The Fourier transform infrared spectra were recorded on a Thermo Nicolet Nexus 670 FTIR spectrometer (for example, Thermo Scientific, Madison, Wis., USA). The nitrogen physisorption isotherms were measured on a Quanta chrome Instrument Corporation Autosorb-1 analyser (for example, Quanta chrome Instrument Corporation, Boynton Beach, Fla., USA).

Electrochemical Measurements

In some embodiments, the electrochemical properties of the as-prepared materials are measured using various methods and/or instruments, including cyclic voltammetry (CV), galvanostatic charge-discharge (GC), and electrochemical impedance spectroscopy (EIS) electrochemical measurements In some examples, the cyclic voltammetry (CV), galvanostatic charge-discharge (GC), and electrochemical impedance spectroscopy (EIS) electrochemical measurements were carried out on Gamry electrochemical workstation (reference 3000, Gamry Co., USA) using a three-electrode system including a Pt wire as counter electrode, Ag/AgCl as a reference electrode, and our prepared samples as working electrodes. The working electrode was prepared by mixing gCN samples (80 wt %) with carbon black (10 Wt %) and poly(vinylidene fluoride) ((PVDF), 5-40 Wt %) in ethanol solvent or any other solvent (e.g. water, isopropanol, formaldehyde, formamide-based, and ethylene glycol) under ultrasonication or stirring at room temperature and then the slurries were dropped onto graphite paper (thickness: 1-50 mm) or carbon-cloth sheet (thickness: 1-50 mm) and dried at 80° C. for 24 hours. The working electrodes were prepared using the same loading amount of each the as-synthesized gCN material. All electrochemical measurements were benchmarked in an aqueous solution of NaCl (1 M) as an electrolyte. The specific capacitances ($C_g$, F $g^{-1}$) was calculated using the following equation:

$$C_g = \int i dV / [2 \times m \times \Delta V \times v],$$

where i is the current (A), m is the mass of active materials (g), $\Delta V$ is the voltage window (V), and v is the scan rate (mV $s^{-1}$) obtained from the CV curves.

Provided herein is a carbon nitride material that is a nitrogen enriched, carbon material doped and undoped with binary metals including Pt and Cu.

In one or any embodiments, the nitrogen enriched carbon material, can be used as or to prepare electrodes for capacitive deionization (CDI).

In one or any embodiments, the carbon nitride material is not doped with one or more metal elements and one or more non-metal traces.

In one or any embodiments, the carbon nitride material is doped with one or more metal elements.

In one or any embodiments, the carbon nitride material is doped with one or more non-metal elements. In one or any preceding embodiments, the metal element is selected from the group consisting of Pt, Pd, Cu, Zn, and Cu. In one or any preceding embodiments, the non-metal trace is selected from the group consisting of S, F, and P.

In one or any embodiments, the carbon nitride material has formula gCN.

In one or any embodiments, the carbon nitride material has a formula Pt—Cu-gCN-Ns, wherein "Ns" refers to nanostructures. In one or any embodiments, the carbon nitride material has a formula Cu—Zn-gCN-Ns, wherein "Ns" refers to nanostructures.

In one or any embodiments, the carbon nitride material is functionalized with carbon-based materials such as carbon nanotube, graphene, activated carbon, metal-organic framework, metal oxides, and zeolite.

In one or any embodiments, the carbon nitride material is a polymer-based materials formed via the polymerization of any nitrogen-carbon precursors such as melamine, urea, cyanuric acid, and thiourea.

In one or any embodiments, the carbon nitride material is in form of films, membrane, and/or hydrogel.

In one or any embodiments, the carbon nitride material is porous.

In one or any embodiments, the carbon nitride material is in form of or has morphology of nanosheet, nanofibers, nanowire, and nanosphere.

In one or any embodiments, the carbon nitride material has average pore size/diameter ranging from 1 nm to 100 nm. In one or any embodiments, the carbon nitride material has average pore size/diameter ranging from 5 nm to 100 nm, 10 nm to 100 nm, 20 nm to 100 nm, 30 nm to 100 nm, 40 nm to 100 nm, 50 nm to 100 nm, 60 nm to 100 nm, 70 nm to 100 nm, 80 nm to 100 nm, or 90 nm to 100 nm. In one or any embodiments, the carbon nitride material has average pore size/diameter ranging from 5 nm to 90 nm, 5 nm to 80 nm, 5 nm to 70 nm, 5 nm to 60 nm, 5 nm to 50 nm, 5 nm to 40 nm, 5 nm to 30 nm, 5 nm to 20 nm, or 5 to 10 nm, 10 nm to 60 nm, 10 nm to 50 nm, 10 nm to 40 nm, 10 nm to 30 nm, 10 nm to 20 nm, 20 nm to 60 nm, 20 nm to 50 nm, 20 nm to 40 nm, 20 to 30 nm, 30 nm to 60 nm, 30 nm to 50 nm, 30 nm to 40 nm, 30 to 35 nm, 40 nm to 60 nm, 40 nm to 50 nm, or 40 to 45 nm. In one or any embodiments, the carbon nitride material has average pore size/diameter of about 40 nm, about 42 nm, about 30 nm, or about 32 nm. In one or any embodiments, the carbon nitride material has formula of Pt—Cu-gCN-Ns and average pore size/diameter of about 42 nm. In one or any embodiments, the carbon nitride material has formula of Pt—Cu-gCN and average pore size/diameter of about 30 nm or 32 nm.

In one or any embodiments, the carbon has an atomic ratio of carbon carbon ranging from 30 to 70, and nitrogen has an atomic ratio ranging from 70 to 30. In one or any preceding embodiments, the carbon has an atomic ratio ranging from 35 to 55, and the nitrogen has an atomic ratio ranging from 30 to 50, the dopant atom(s) has an atomic ratio ranging from 0.1 to 2. In one or any embodiments, the carbon nitride material of any of preceding claims, which has formula Pt—Cu-gCN-Ns and atomic ratio of Pt/Cu/C/N about 0.4/0.6/45.1/35.9.

In one or any embodiments, the carbon nitride material has formula Pt—Cu-gCN-Ns characterized as having a diffraction peak at about 13.1° and a strong peak assigned to the {100} and {002} facets determined by X-ray diffraction patterns (XRD).

In one or any embodiments, the carbon nitride material is characterized as having Brunauer-Emmett-Teller surface area ranging from 140 $m^2/g$ to 200 $m^2/g$, 150 $m^2/g$ to 200 $m^2/g$, 160 $m^2/g$ to 200 $m^2/g$, 170 $m^2/g$ to 200 $m^2/g$, 180 $m^2/g$ to 200 $m^2/g$, 190 $m^2/g$ to 200 $m^2/g$, 140 $m^2/g$ to 150 $m^2/g$, 140 $m^2/g$ to 160 $m^2/g$, 140 $m^2/g$ to 170 $m^2/g$, 140 $m^2/g$ to 180 $m^2/g$, or 140 $m^2/g$ to 190 $m^2/g$. In one or any embodiments, the carbon nitride material is characterized as having Brunauer-Emmett-Teller surface area ranging from 140 $m^2/g$ to 200 $m^2/g$, 150 $m^2/g$ to 200 $m^2/g$, 160 $m^2/g$ to 200 $m^2/g$, 170 $m^2/g$ to 200 $m^2/g$, 180 $m^2/g$ to 200 $m^2/g$, 190 $m^2/g$ to 200 $m^2/g$, 140 $m^2/g$ to 150 $m^2/g$, 140 $m^2/g$ to 160 $m^2/g$, 140 $m^2/g$ to 170 $m^2/g$, 140 $m^2/g$ to 180 $m^2/g$, or 140 $m^2/g$ to 190 $m^2/g$.

In one or any embodiments, the carbon nitride material is Pt—Cu-gCN-Ns characterized as having Brunauer-Emmett-Teller surface area of about 180.3 $m^2/g$.

In one or any embodiments, the carbon nitride material has formula gCN characterized as having Brunauer-Emmett-Teller surface area of about 150.2 $m^2/g$.

In one or any embodiments, the carbon nitride material has or is characterized as having salt adsorption capacity, measured by ion chromatograph over seawater, ranging from 10% to 98%. In one or any embodiments, the carbon nitride material has or is characterized as having salt adsorption capacity, measured by ion chromatograph over seawater, ranging from 10% to 98%, 20% to 98%, 30% to 98%, 40% to 98%, 50% to 98%, 60% to 98%, 70% to 98%, 80% to 98%, 90% to 98%, 10% to 90%, 10% to 80%, 10% to 70%, 10% to 60%, 10% to 50%, 10% to 40%, 10% to 30%, 10% to 20%, 20% to 70%, 20% to 60%, 20% to 50%, 20% to 40%, 20% to 30%, 30% to 60%, 30% to 50%, or 30% to 40%. In one or any embodiments, the carbon nitride material has or is characterized as having salt adsorption capacity, measured by ion chromatograph over seawater, ranging from 30% to 40% or from 10% to 20%. In one or any preceding embodiments, the salt adsorption capacity was measured under UV-light irradiation. In one or any embodiments, the salt adsorption capacity was measured over a time period of 2 minutes to 90 minutes. In one or any embodiments, the salt adsorption capacity was measured over a time period of 0.5 seconds to 8 seconds.

In one or any embodiments, the carbon nitride material has formula Pt—Cu-gCN-Ns, and has or is characterized as having salt adsorption capacity, measured by ion chromatograph over seawater, of about 35.7%.

In one or any embodiments, carbon nitride material has formula gCN, and has or is characterized as having salt adsorption capacity, measured by ion chromatograph over seawater, of about 15.5%.

Provided herein is a method for preparing the carbon nitride material disclosed herein, the method comprising:
(1) provide a solution comprising metal precursor(s) and a solvent (such as ethanol, methanol, isopropanol, water, and ethylene glycol);
(2) adding a nitrogen-carbon precursor (such as melamine, urea, cyanuric acid, and thiourea) to the solution of step (1) to form a first mixture, optionally under stirring or other mechanic means to facilitate mixing;
(3) adding an acid (such as nitric acid and hydrochloric acid which can be used to initiate the polymerization) to the mixture of step (2) to form a second mixture;
(4) aging the second mixture of step (3) to form a slurry;
(5) filtering and washing the slurry with one or more solvents, preferably water and/or ethanol, to obtain a wet solid;
(6) annealing the wet solid of step (5).

In one or any embodiments, the metal precursors are selected from potassium tetrachloroplatinate (II), copper (II) sulfate pentahydrate, zinc chloride (II), and copper (II) chloride. In one or any embodiments, the metal precursors are potassium tetrachloroplatinate (II) and copper (II) sulfate pentahydrate. In one or any embodiments, the metal precursors are zinc chloride (II) and copper (II) chloride.

In one or any embodiments, the solvents are ethanol, methanol, isopropanol, water, and ethylene glycol.

In one or any embodiments, the acid is nitric acid ($HNO_3$) or hydrochloric acid (HCl) which can be used to initiate the polymerization.

Provided herein is an electrode comprising a carbon nitride material of one or any of embodiments provided herein.

Provided herein is a method for preparing an electrode comprising a carbon nitride material of one or any embodiments provided herein, the method comprising:
(a) mixing the carbon nitride material of one or any embodiment provided herein with carbon black and poly(vinylidene fluoride) in ethanol under ultrasonication at room temperature to form a slurry, wherein the weight ratio of the carbon nitride material, carbon black and poly(vinylidene fluoride) is 80/10/10,
(b) dropping the slurry formed in step (a) onto a graphite paper to form a film,
(c) drying the film at 80° C. for 24 hours.

In one or any embodiments, in step (c), the film has an average thickness is about 1 mm.

Provided herein is a method for preparing an electrode comprising a carbon nitride material of one or any embodiments, the method comprising:
(a) dissolving the carbon nitride material in an aqueous solution of acetic acid to form a solution,
(b) adding chitosan hydrogel to the solution of step (a) to form a homogenous slurry,
(c) casting the homogenous slurry of step (b) using a doctor-blade to obtain a membrane.

In one or any embodiments, in step (c), the membrane has an average thickness is about 1 mm.

Provided herein is an electrode made by a method for preparing an electrode provided herein.

Provided herein is capacitive deionization (CDI) process, comprising:
(a) providing two electrodes in a cell containing a saline water solution;
(b) applying a potential of 0.1 to 2 V.

In one or any embodiments of the CDI process, the potential is applied at room temperature. In one or any embodiments, the potential is applied while the saline water solution is under heating, or under a pressure, or under light irradiation, or under a flow rate. In one or any embodiments, the saline water is seawater, brackish water, or wastewater.

In one or any embodiments, the CDI process is used for water treatment processes selected from heavy metal removal, dyes degradation, and pollutants removal. In one or any embodiments, the pollutants removal is under conditions selected from heating, room temperature, electrochemically, photochemical, photoelectrochemical, and physiochemical.

Provided herein is a capacitive deionization (CDI) system, comprising:
a power supply,
a cell comprising electrodes, and
a container for desalinated water.

In one or any embodiments of the CDI system, the system further comprises a light source. In one or any embodiments, the CDI system further comprises a magnetic stirrer. The CDI system is designed as a portable CDI system works by the sunlight (e.g. using a solar cell to convert the solar light to electricity to supply the electrode materials with the required voltage to work) for personal usage. In one or any embodiments, the CDI system is designed for use works by the sunlight to be feasible for the large-scale applications. In one or any embodiments, the CDI system is used for energy conversion, energy production, energy storage, hydrogen production, and oxygen production. In one or any embodiments, the CDI system is used for water disinfection against bacteria, fungi, and virus.

EXAMPLES

Example 1. CDI System

Figure 1:
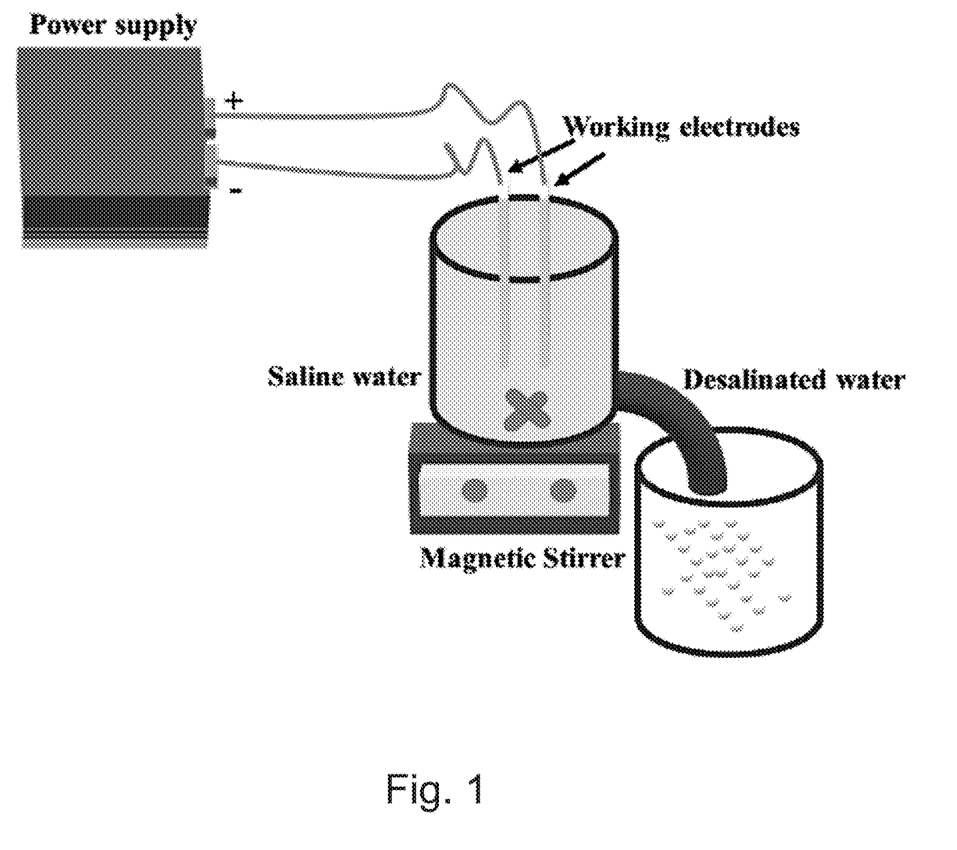
FIG. 1 shows an exemplary CDI setup.

As shown in FIG. 1, the designed CDI system consists of or comprising a power supply unit, cell, and working electrodes as well as a light source. The working electrodes were prepared by dissolving of active materials (10 mg) in an aqueous solution of acetic acid (20%) and then added to chitosan hydrogel (medium 4 wt %) until formation of homogenous slurry followed by casting using by a doctor-blade to obtain membrane (5 $cm^2$) with an average thickness of 1 mm. It should be noticed that, chitosan polymer can be replaced with any other natural or synthetic water-soluble or insoluble polymers such as cellulose, polycaprolactone, and poly(methyl methacrylate). Also, acetic acid solvent can be replaced with dimethylformamide, formaldehyde, and ethyl alcohol based on the used polymer. Meanwhile, the thickness of the working electrode could be varied from 3 mm to 1 cm. The measurements were performed in a saline water solution contains (35,000 ppm) under an applied potential of 1 V with and without light stimulation. The measurements were carried out under an applied potential of 1 V at room temperature with a rotation speed of 200 rpm. Various samples were withdrawn at different times and analyzed by the ion chromatography (PerkinElmer 200 LC, USA). The working electrode areas were 2 cm$^{2t}$ and the distance between two electrodes was 0.5 cm$^2$. The cell volume was fixed at 0.5 liters.

Example 2. Preparation of Pt—Cu-gCN-Ns Multi-Layered Nanosheets

Two dimensional Pt—Cu-gCN-Ns multi-layered nanosheets were prepared by the following method: melamine (1 g) was added into an aqueous solution of 60 mL ethanol containing potassium tetrachloroplatinate (II) (1 mL of 20 mM) and copper (II) sulfate pentahydrate (1 mL of 20 mM) under stirring at 30° C.; nitric acid (30 mL of 1 M) was then quickly added; the resulting mixture was left for 2 hours to age; a yellowish slurry was obtained, filtered and washed with ethanol and water for four times to remove any unreacted materials, the wet solid obtained from filtering and washing was dried at 100° C. for 2 hours, and was annealed at 600° C. for 2 hours under nitrogen in a tube furnace, wherein the heating and cooling rate was 3.08° C./min.

Two-dimensional dopant-free gCN nanosheets were synthesized by the same method above without using potassium tetrachloroplatinate (II) and copper (II) sulfate, with fixing all other reaction conditions and parameters.

Example 3. Characterization of Pt—Cu-gCN-Ns Multi-Layered Nanosheets

Figure 2A:
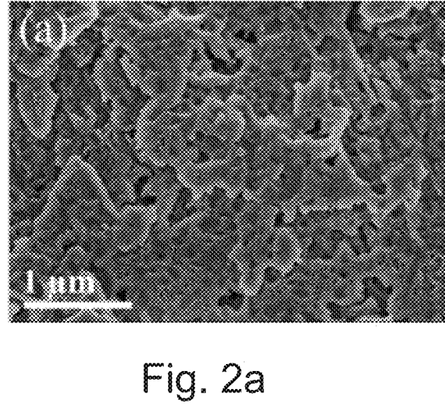
FIGS. 2a, 2b, 2c, and 2d show scanning electron microscopy (SEM) images.
Figure 2B:
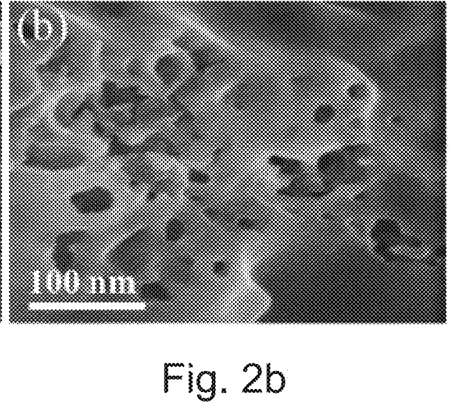
Figure 2C:
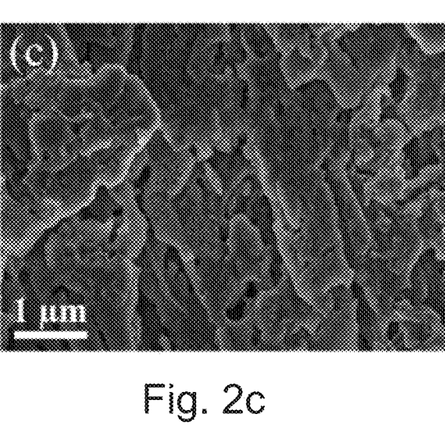
Figure 2D:
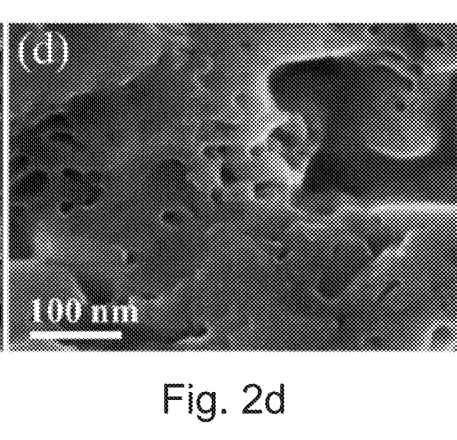

FIG. 2a shows the SEM image of typically prepared Pt—Cu-gCN-Ns under typical conditions formed in a high yield of multi-layered nanosheets. These nanosheets are porous with an average pore diameter of 40±3 nm along with some small pores in the range of 10 nm (FIG. 2b). FIG. 2c displays the SEM image of metal-free gCN formed in a nanosheets structure. The nanosheets possess lower porosity relative to Pt—Cu-gCN-Ns. The average pores size is about 30 nm with inferior small pores.

Figure 3A:
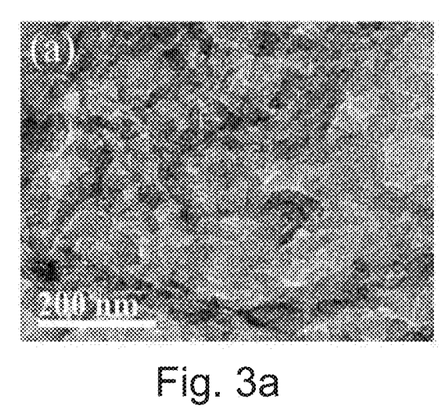
FIGS. 3a, 3b, 3c, 3d, 3e, and 3f show transmission electron microscopy (TEM) images.
Figure 3B:
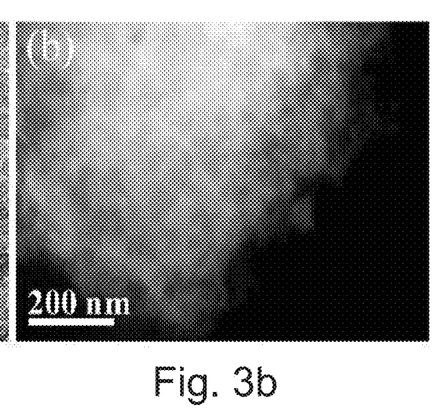
Figure 3C:
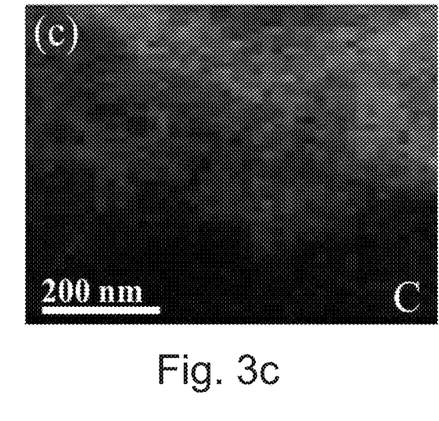
Figure 3D:
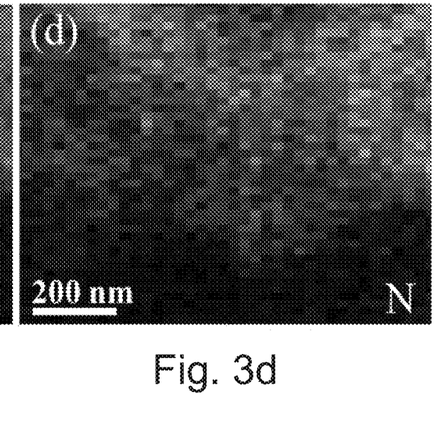
Figure 3E:
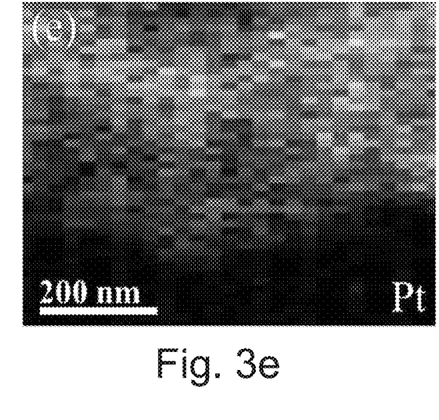
Figure 3F:
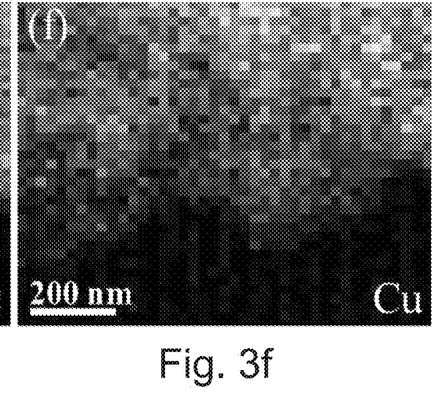

FIG. 3a shows the TEM image of Pt—Cu-gCN-Ns, obtained in well-defined multiple layered nanostructures with various pores. Both Pt and Cu could not be observed in the TEM image owing to their atomic doping inside the skeleton structure of gCN. The high-angle annular dark-field scanning transmission electron microscopy (HAADF-STEM) image clearly warrants the formation of porous nanosheets as confirmed by the difference in the contrast between porous and solid area (FIG. 3b). The element mapping analysis is used to investigate the composition of the as-synthesized Pt—Cu-gCN-Ns, which reveal the coherent distribution of Pt, Cu, C, and N in the as obtained materials (FIGS. 3c-f). The atomic ratios of Pt/Cu/C/N are about 0.4/0.6/45.1/35.9, respectively, indicates the formation of gCN co-doped with Pt and Cu.

Figure 4:
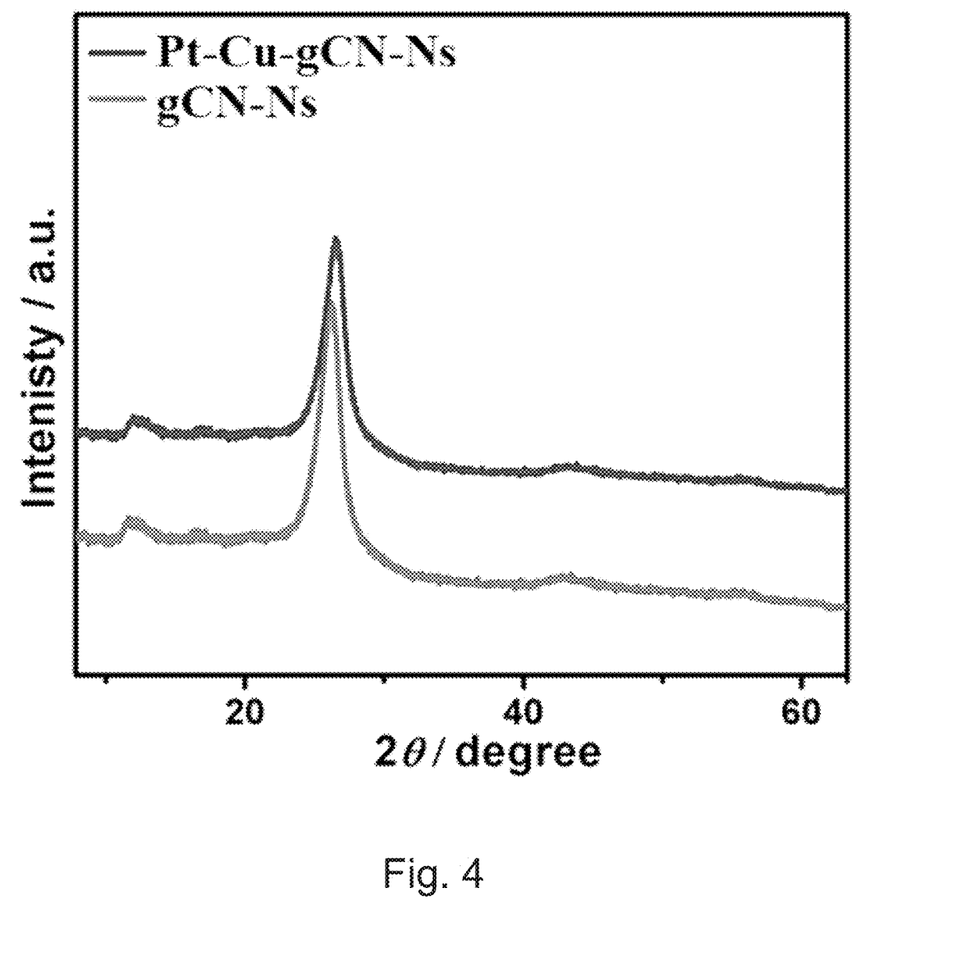
FIG. 4 shows the XRD analysis of Pt—Cu-gCN-Ns compared to gCN-Ns which both depict a small diffraction peak a with lower relative intensity at ~13.1° assigned to the {100} facet and sharp peak with a significant higher intensity at ~27.2° attributed to the {002} facets of graphitic-like gCNs. The diffraction peaks of Pt—Cu-gCN-Ns were positively shifted towards higher angle values and showed a lower intensities and half width maximum than that of gCN-Ns.
Figure 5A:
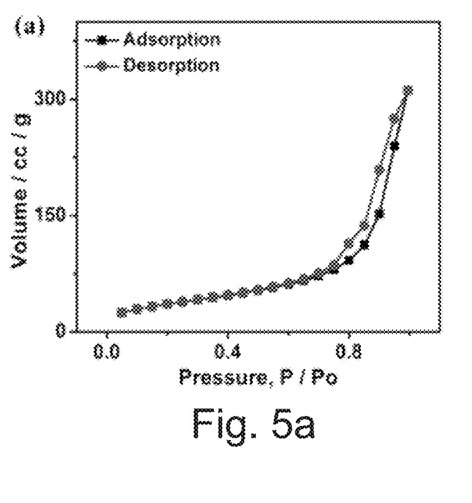
FIGS. 5a, 5b, 5c, and 5d show nitrogen adsorption-desorption isotherm and pore size distribution of (a) Pt—Cu-gCN-Ns and (b) gCN-Ns.
Figure 5B:
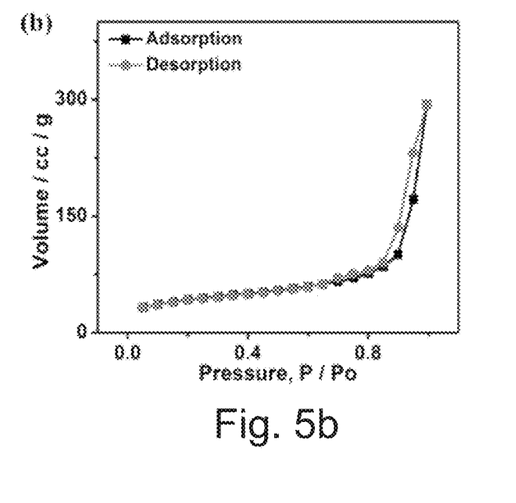
Figure 5C:
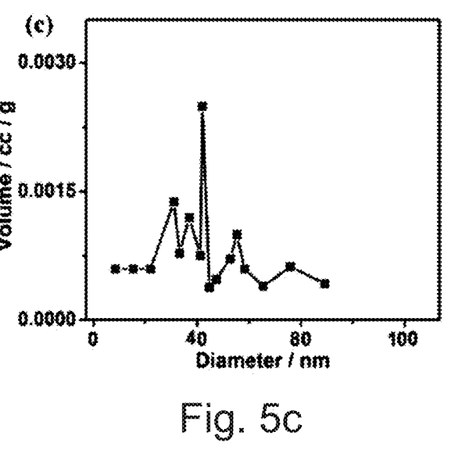
Figure 5D:
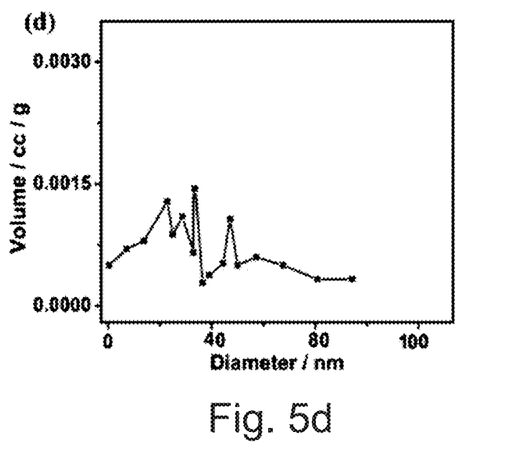

FIG. 4 shows the XRD analysis of Pt—Cu-gCN-Ns compared to gCN-Ns which both depict a small diffraction peak at 13.1° and a strong peak assigned to the {100} and {002} facets of graphitic-like gCNs. Owing to the co-doping effect with Pt and Cu, the diffraction patterns of Pt—Cu-gCN-Ns slightly shifted positively than gCN-Ns.

FIG. 5 displays the nitrogen isotherm measurements of Pt—Cu-gCN-Ns compared to gCN-Ns, which both reveal the isotherm features close to a type I hysteresis loop curve. The Brunauer-Emmett-Teller surface area of Pt—Cu-gCN-Ns (180.3 m$^2$ g$^{-1}$) (FIG. 5a) is higher than gCNs (150.2 m$^2$ g$^{-1}$) (FIG. 5c). Both Pt—Cu-gCN-Ns and gCNs display multimodal pore-size distribution determined by Barrett-Joyner-Halenda method. The average pore size distribution of Pt—Cu-gCN-Ns (42 nm) (FIG. 5b) is larger than that of gCN-Ns (32 nm) (FIG. 5d).

Example 5. Preparation of Spatial gCN-Ns Multiple Porous Structure Doped with Copper (Cu) and Zinc (Zn) Denoted as (Cu—Zn-gCN-Ns)

Three-dimensional gCN-Ns with multiple porous structure and doped with Cu and Zn were obtained using the following method: melamine (1 gram) and 2,2'-Bipyridine (0.5 g) were added into an aqueous solution of 60 mL ethanol containing zinc chloride (II) (1 mL of 20 mM) and copper (II) chloride (1 mL of 20 mM) under stirring at 30° C.; nitric acid (30 mL of 1 M) was then quickly added; the resulting mixture was left for 2 hours to age; a yellowish slurry was obtained, filtered and washed with ethanol and water for four times to remove any unreacted materials, the wet solid obtained from filtering and washing was dried at 100° C. for 2 hours, and was annealed at 600° C. for 2 hours under nitrogen in a tube furnace, wherein the heating and cooling rate was 3.08° C./min.

Figure 6A:
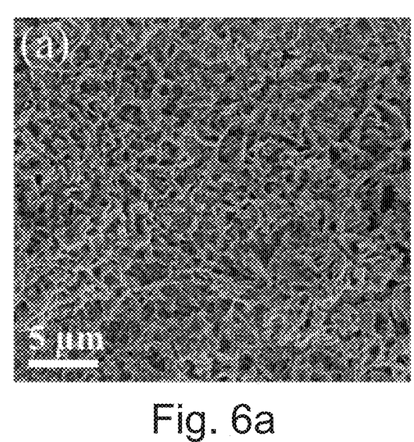
FIGS. 6a and 6b shows the SEM image of Cu—Zn-gCN-Ns.
Figure 6B:
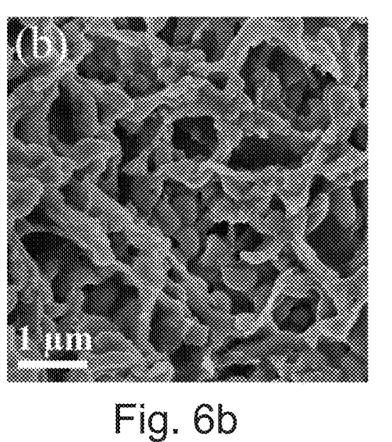
Figure 6C:
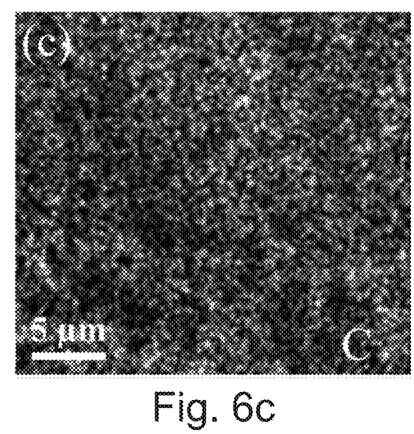
FIG. 6c, FIG. 6d, FIG. 6e, and FIG. 6f show the element mapping analysis used to investigate the composition of the as-synthesized Cu—Zn-gCN-Ns, which reveal the coherent distribution of C, N, Cu, and Zn, in the as-obtained materials.
Figure 6D:
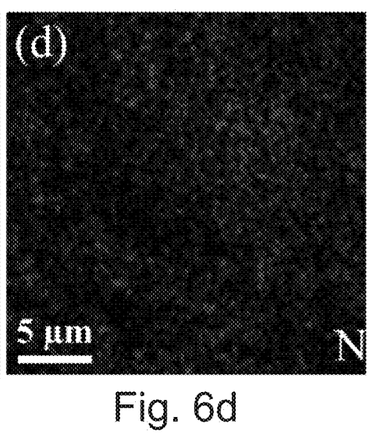
Figure 6E:
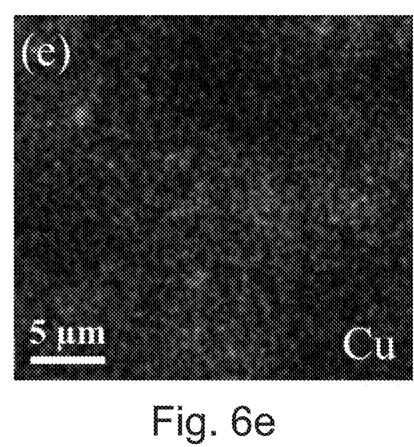
Figure 6F:
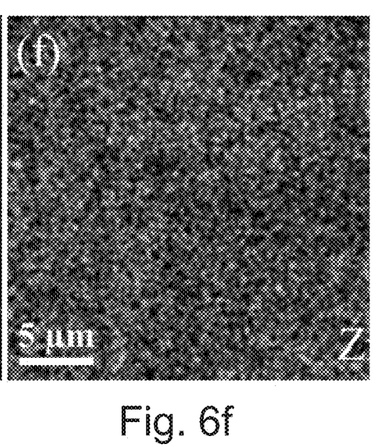

FIG. 6a displays the SEM image of Cu—Zn-gCN-Ns obtained in a well-defined network-like structure. The obtained structure is composed of multiple crumbed nanosheets assembled together in a spatial network-like structure with an average mesoporous of 30 nm and average macrospores of 800 nm (FIG. 6b). The elemental mapping analysis revealed the homogenous distribution of C, N, Cu, and Zn with atomic ratios of 35, 63.5, 0.8, and 0.7, respectively (FIG. 6c-f).

Example 6

CDI salt adsorption capacity of Pt—Cu-gCN-Ns as a function of time was measured. The light effect on CDI salt adsorption capacity of Pt—Cu-gCN-Ns were measured.

Figure 7:
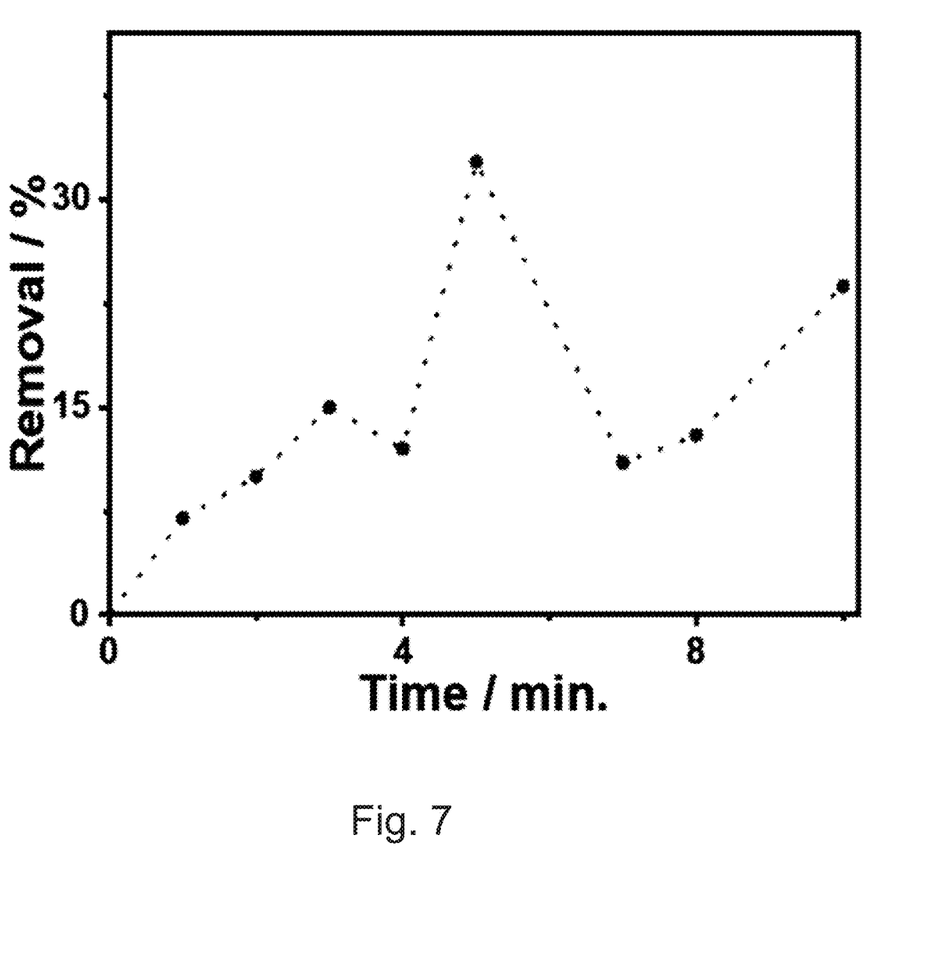
FIG. 7 shows CDI adsorption capacity of Pt—Cu-gCN-Ns under dark.
Figure 8:
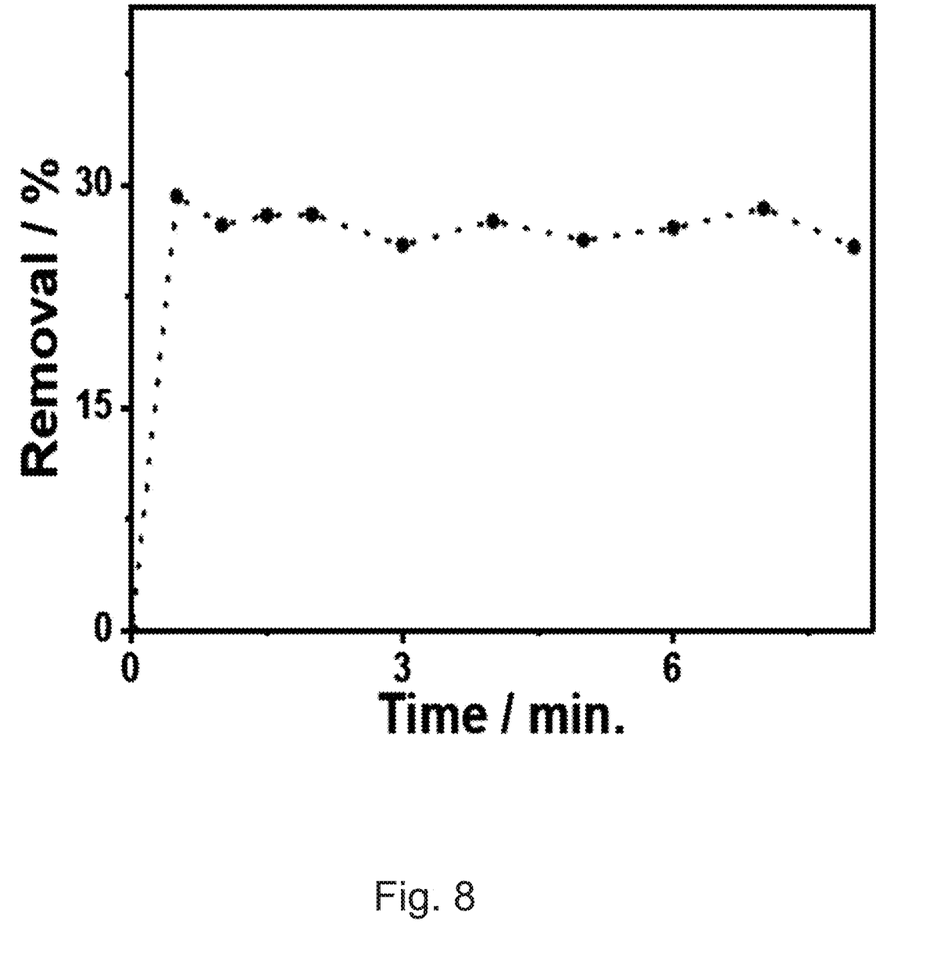
FIG. 8 shows the CDI adsorption capacity of Pt—Cu-gCN-Ns under light.

FIG. 7 shows the CDI salt adsorption capacity of Pt—Cu-gCN-Ns as a function of time estimated by the ion chromatography over seawater (35,000 ppm) without any kind of commercial additives such as activated graphene, carbon cloth, polymeric binders, and/or graphic sheets. Within only 5 min, Pt—Cu-gCN-Ns achieved an adsorption capacity of 32.7%, indicates its quick adoration capacity. Intriguingly enough under UV-light irradiation, within only 30 seconds Pt—Cu-gCN-Ns achieved an adsorption capacity of 29.3%, owing to its unique photo properties (FIG. 8). These results differ from the traditional reports on CDI, which only desalinate the brackish water and/or water with low salt concentration (500-5000 ppm). However, the maximum reported CDI efficiency under such conditions was nearly 80-93.5% under applied voltages of 1.4-1.6 V. [6, 8, 13, 20, 21]

To further confirm the quick adsorption properties of the developed Pt—Cu-gCN-Ns, various ionic chromatography measurements at different times were carried out. Table 1 shows the adsorption capacity of Pt—Cu-gCN-Ns relative to gCN-Ns over seawater (NaCl=35,000 ppm). The maximum adsorption capacity on Pt—Cu-gCN-Ns (35.71429%) obtained after 20 min that is almost 2.31 times higher than that of metal-free gCN (15.51429%). The adsorption capacity on both materials did not change significantly even after 90 min under the same reaction conditions and parameters.

TABLE 1

Comparison between the CDI efficiency on Pt—Cu-gCN-Ns relative to gCN-Ns.

| Materials | Time (Min) | Na (ppm) | Cl (ppm) | NaCl (ppm) | Adsorption % |
|---|---|---|---|---|---|
| gCN-Ns | 2 | 120.9 | 184 | 304.9 | 12.88571 |
|  | 5 | 118.1 | 178.7 | 296.8 | 15.2 |
|  | 7 | 118.9 | 181.7 | 300.6 | 14.11429 |
|  | 10 | 125.6 | 191.1 | 316.7 | 9.514286 |
|  | 20 | 117.7 | 178 | 295.7 | 15.51429 |
|  | 30 | 119.9 | 183.2 | 303.1 | 13.4 |
|  | 40 | 117.3 | 179 | 296.3 | 15.34286 |
|  | 50 | 118.3 | 179 | 297.3 | 15.05714 |
|  | 60 | 121.3 | 185.3 | 306.6 | 12.4 |
|  | 70 | 119.3 | 181.3 | 300.6 | 14.11429 |
|  | 80 | 121.3 | 183.7 | 305 | 12.85714 |
|  | 90 | 122.7 | 186.96 | 309.66 | 11.52571 |
| Pt—Cu-gCN-Ns | 2 | 16 | 330.5 | 346.5 | 1 |
|  | 5 | 93.85 | 141.65 | 235.5 | 32.71429 |
|  | 7 | 123.75 | 187.8 | 311.55 | 10.98571 |
|  | 10 | 105.6 | 161.3 | 266.9 | 23.74286 |
|  | 20 | 89.7 | 135.3 | 225 | 35.71429 |
|  | 30 | 115.9 | 175.8 | 291.7 | 16.65714 |
|  | 40 | 97.1 | 146.4 | 243.5 | 30.42857 |
|  | 50 | 118.8 | 181.1 | 299.9 | 14.31429 |
|  | 60 | 97 | 148 | 245 | 30 |
|  | 70 | 103.6 | 157.2 | 260.8 | 25.48571 |
|  | 80 | 97.9 | 147.8 | 245.7 | 29.8 |
|  | 90 | 90.5 | 137 | 227.5 | 35 |

Table 2 shows the effect of light on the adsorption capacity of Pt—Cu-gCN-Ns and gCN-Ns.

TABLE 2

Comparison between the CDI efficiency on Pt—Cu-gCN-Ns relative to gCN-Ns under UV-light irradiation.

| Electrode | Time (MM) | Na (ppm) | Cl (ppm) | NaCl (ppm) | Adsorption % |
|---|---|---|---|---|---|
| gCN-Ns | 0.5 | 95.8 | 158.5 | 254.3 | 27.34286 |
|  | 1 | 100.1 | 166.3 | 266.4 | 23.88571 |
|  | 1.5 | 96.2 | 159.5 | 255.7 | 26.94286 |
|  | 2 | 98.4 | 163.8 | 262.2 | 25.08571 |
|  | 3 | 93.4 | 155.5 | 248.9 | 28.88571 |
|  | 4 | 93.9 | 156.1 | 250 | 28.57143 |
|  | 5 | 96.1 | 159.8 | 255.9 | 26.88571 |
|  | 6 | 97.2 | 160.9 | 258.1 | 26.25714 |
|  | 7 | 95.8 | 159.1 | 254.9 | 27.17143 |
|  | 8 | 96.2 | 159.9 | 256.1 | 26.82857 |
| Pt—Cu-gCN-Ns | 0.5 | 92.97 | 154.7 | 247.67 | 29.23694 |
|  | 1 | 95.36 | 159.1 | 254.46 | 27.29714 |
|  | 1.5 | 94.7 | 157.47 | 252.17 | 27.95143 |
|  | 2 | 94.6 | 157.36 | 251.96 | 28.01143 |
|  | 3 | 97.3 | 161.9 | 259.2 | 25.94286 |
|  | 4 | 95.1 | 158.4 | 253.5 | 27.57143 |
|  | 5 | 97.1 | 160.9 | 258 | 26.28571 |
|  | 6 | 95.8 | 159.3 | 255.1 | 27.11429 |
|  | 7 | 94.15 | 156.34 | 250.49 | 28.43143 |
|  | 8 | 97.6 | 162 | 259.6 | 25.82857 |

CDI Mechanism on Pt—Cu-gCN-Ns

Figure 9:
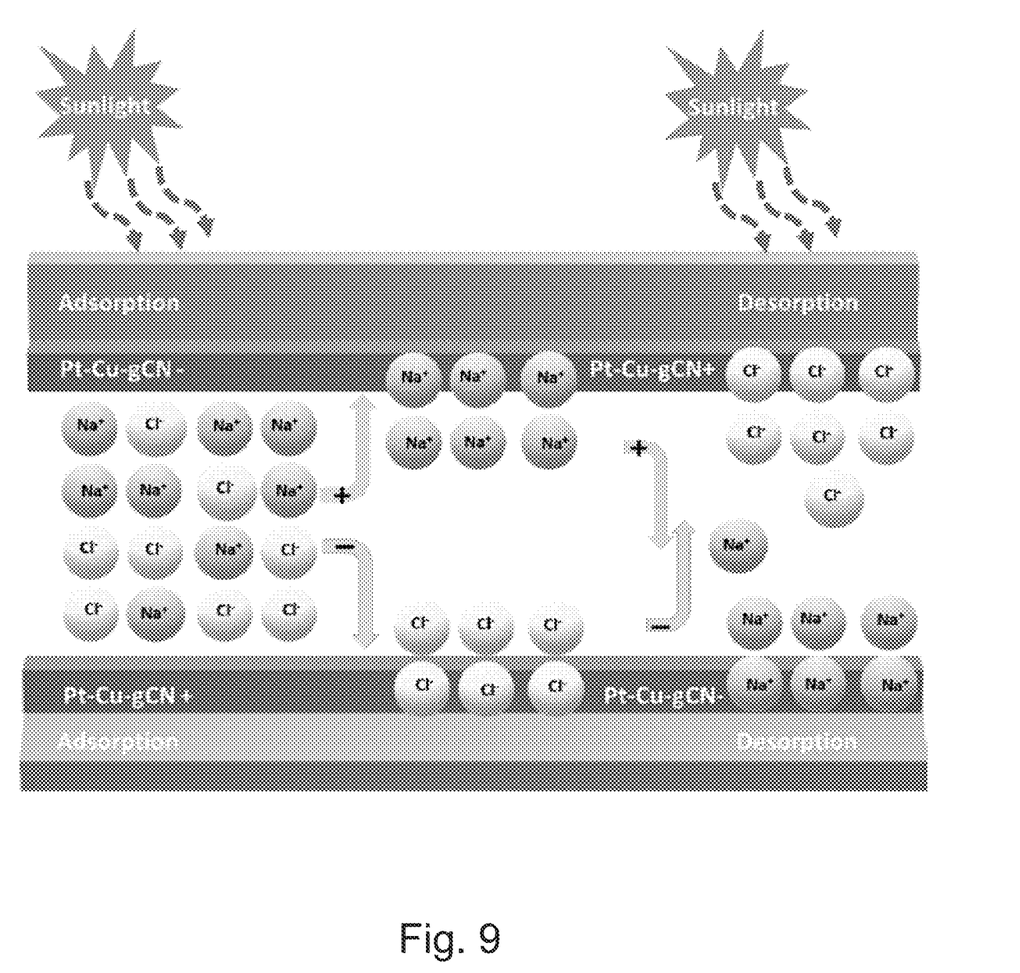

FIG. 9 demonstrates the CDI mechanism on Pt—Cu-gCN-Ns based on the on the electrical double layer. This is including the removal the ions of NaCl during the charging process ($Na^+$ ions are adsorbed on the cathode, while $Cl^-$ are adsorbed on the anode). Following that, the salt ions are released during the discharge process. Nitrogen, Pt, and Cu atoms inside the carbon skeleton structure provide abundant adsorption sites for NaCl ions during the charging step. The sunlight stimulates the adsorption capacity of Pt—Cu-gCN-Ns, owing to its photo properties.

On the other hand, compared to previous reports on the CDI, all the CDI measurements on the electrodes disclosed herein were conducted on seawater and without using any kind of commercial conductive additives or materials along with fixing the potential at 1 V at room temperature. [21] This is to evaluate the CDI efficiency of the electrode materials disclosed herein under the harshest parameters before carrying out any improvements. The CDI efficiency of the materials disclosed herein could be easily improved significantly via carrying out some additional experiments. Therefore, the presented invention is not limited to the embodiments beforehand mentioned, but comprises the embodiments within the following claims.

REFERENCES

1. Boulay, A.-M., et al., *The WULCA consensus characterization model for water scarcity footprints: assessing impacts of water consumption based on available water remaining (AWARE)*. The International Journal of Life Cycle Assessment, 2018. 23(2): p. 368-378.
2. Diehl, P., *Environmental conflict: An anthology*. 2018: Routledge.
3. Oladunni, J., et al., *A comprehensive review on recently developed carbon based nanocomposites for capacitive deionization: from theory to practice*. Separation and Purification Technology, 2018.
4. Porada, S., et al., *Review on the science and technology of water desalination by capacitive deionization*. Progress in materials science, 2013. 58(8): p. 1388-1442.
5. Likhachev, D. S. and F.-C. Li, *Large-scale water desalination methods: a review and new perspectives*. Desalination and Water Treatment, 2013. 51(13-15): p. 2836-2849.
6. Dykstra, J., et al., *Energy consumption in capacitive deionization—Constant current versus constant voltage operation*. Water research, 2018. 143: p. 367-375.
7. Singh, K., et al., *Timeline on the application of intercalation materials in Capacitive Deionization*. Desalination, 2019. 455: p. 115-134.
8. Ahmed, M. A., and S. Tewari, *Capacitive deionization: Processes, materials and state of the technology*. Journal of Electroanalytical Chemistry, 2018. 813: p. 178-192.
9. Thamilselvan, A., A. Nesaraj, and M. Noel, *Review on carbon-based electrode materials for application in capacitive deionization process*. International journal of environmental science and technology, 2016. 13(12): p. 2961-2976.
10. Gao, T., et al., *Metal-organic-framework derived carbon polyhedron and carbon nanotube hybrids as electrode for electrochemical supercapacitor and capacitive deionization*. Electrochimica Acta, 2018. 263: p. 85-93.
11. Han, B., et al., *Structure and functionality design of novel carbon and faradaic electrode materials for high-performance capacitive deionization*. Chemical Engineering Journal, 2018.
12. Xu, X., et al., *Capacitive deionization using nitrogen-doped mesostructured carbons for highly efficient brackish water desalination*. Chemical Engineering Journal, 2019. 362: p. 887-896.
13. Wang, M., et al., *High performance capacitive deionization electrodes based on ultrathin nitrogen-doped carbon/graphene nano-sandwiches*. Chemical Communications, 2017. 53(78): p. 10784-10787.
14. Zhu, J., et al., *Graphitic carbon nitride: synthesis, properties, and applications in catalysis*. ACS applied materials & interfaces, 2014. 6(19): p. 16449-16465.

15. Wang, X., S. Blechert, and M. Antonietti, *Polymeric graphitic carbon nitride for heterogeneous photocatalysis*. Acs Catalysis, 2012. 2(8): p. 1596-1606.
16. Inagaki, M., et al., *Graphitic carbon nitrides (g-C3N4) with comparative discussion to carbon materials*. Carbon, 2018.
17. Kessler, F. K., et al., *Functional carbon nitride materials—design strategies for electrochemical devices*. Nature Reviews Materials, 2017. 2(6): p. 17030.
18. Niu, W. and Y. Yang, *Graphitic Carbon Nitride for Electrochemical Energy Conversion and Storage*. ACS Energy Letters, 2018. 3(11): p. 2796-2815.
19. Zhang, C., et al., *Graphitic carbon nitride (g-C3N4)-based photocatalysts for water disinfection and microbial control: A review*. Chemosphere, 2018.
20. Suss, M., et al., *Water desalination via capacitive deionization: what is it and what can we expect from it?* Energy & Environmental Science, 2015. 8(8): p. 2296-2319.
21. Choi, J., et al., *Applications of capacitive deionization: Desalination, softening, selective removal, and energy efficiency*. Desalination, 2019. 449: p. 118-130.

What is claimed is:

1. A carbon nitride material that is a nitrogen enriched carbon material; wherein the carbon nitride material is atomically doped with one or more metal elements selected from the group consisting of Pt, Pd, Cu, Zn, and Cu; wherein the carbon nitride material is porous and has an average pore size/diameter ranging from 1 nm to 100 nm; and characterized as having Brunauer-Emmett-Teller surface area ranging from 140 $m^2/g$ to 200 $m^2/g$.

2. The carbon nitride material of claim 1, which is further atomically doped with one or more non-metal traces.

3. The carbon nitride material of claim 2, wherein the non-metal trace is selected from the group consisting of S, F, and P.

4. The carbon nitride material of claim 1, which is functionalized with carbon-based materials selected from the group consisting of carbon nanotube, graphene, activated carbon, metal-organic framework, metal oxides, and zeolite.

5. The carbon nitride material of claim 1, which is a polymer-based composite.

6. The carbon nitride material of claim 5, which is in the form of films, membrane, and/or hydrogel.

7. The carbon nitride material of claim 1, which has the form selected from a nanosheet, nanofibers, nanowire, and nanosphere.

8. The carbon nitride material of claim 1, wherein the carbon has an atomic ratio ranging from 30 to 70, and the nitrogen has an atomic ratio ranging from 70 to 30.

9. The carbon nitride material of claim 1, having an atomic ratio of Pt/Cu/C/N about 0.4/0.6/45.1/35.9.

10. The carbon nitride material of claim 1, characterized as having a diffraction peak at about 13.1° and a strong peak assigned to the {100} and {002} facets determined by X-ray diffraction patterns (XRD).

11. The carbon nitride material of claim 1, having a Brunauer-Emmett-Teller surface area of about 180.3 $m^2/g$.

12. The carbon nitride material of claim 1, having a salt adsorption capacity, measured by ion chromatograph over seawater, ranging from 10% to 98%.

13. The carbon nitride material of claim 1, having a salt adsorption capacity, measured by ion chromatograph over seawater, ranging from 30% to 40% or from 10% to 20%; wherein the salt adsorption capacity was measured under UV-light irradiation; and wherein the salt adsorption capacity was measured over a time period of 2 minutes to 90 minutes.

14. The carbon nitride material of claim 1, which is Pt—Cu-gCN-Ns having a salt adsorption capacity, measured by ion chromatograph over seawater, of about 35.7%.

15. The carbon nitride material of claim 1, which is gCN having a salt adsorption capacity, measured by ion chromatograph over seawater, of about 15.5%.

16. A method for preparing an electrode comprising a carbon nitride material of claim 1, the method comprising:

(a) mixing the carbon nitride material of claim 1 with carbon black and poly(vinylidene fluoride) in ethanol under ultrasonication at room temperature to form a slurry, wherein the weight ratio of the carbon nitride material, carbon black and poly(vinylidene fluoride) is 80/10/10;

(b) dropping the slurry formed in step (a) onto a graphite paper to form a film; and (c) drying the film at 80° C. for 24 hours.

17. The method of claim 16, wherein in step (c), the film has an average thickness of about 1 mm.

18. A method for preparing an electrode comprising a carbon nitride material of any of claim 1, the method comprising:

(a) dissolving the carbon nitride material in an aqueous solution of acetic acid to form a solution;

(b) adding chitosan hydrogel to the solution of step (a) to form a homogenous slurry;

(c) casting the homogenous slurry of step (b) using a doctor-blade to obtain a membrane.

19. The method of claim 18, wherein in step (c), the membrane has an average thickness of about 1 mm.

* * * * *